United States Patent [19]

Sawamoto et al.

[11] 4,450,814
[45] May 29, 1984

[54] AIR-FUEL RATIO CONTROL APPARATUS AND METHOD FOR AN INTERNAL COMBUSTION ENGINE WITH A TURBOCHARGER

[75] Inventors: Kunifumi Sawamoto; Tatsuo Morita; Kenji Ikeura; Hiroshi Yamaguchi, all of Yokosuka, Japan

[73] Assignee: Nissan Motor Company, Limited, Yokohama, Japan

[21] Appl. No.: 357,646

[22] Filed: Mar. 12, 1982

[30] Foreign Application Priority Data

Mar. 13, 1981 [JP] Japan .................... 56-36062

[51] Int. Cl.³ ............ F02D 5/02; F02B 3/00
[52] U.S. Cl. .................... 123/478; 123/478; 123/564; 123/198 D
[58] Field of Search .......... 123/478, 564, 198 D, 123/489

[56] References Cited

U.S. PATENT DOCUMENTS

| | | | |
|---|---|---|---|
| 2,336,844 | 12/1943 | Buck | 123/564 |
| 2,483,941 | 10/1949 | Sherman | 123/564 |
| 3,881,456 | 5/1975 | Nohira et al. | 123/198 D |
| 4,142,427 | 3/1979 | Grevich | 123/564 |
| 4,155,332 | 5/1979 | Yaegashi et al. | 123/478 |
| 4,279,231 | 7/1981 | Lindberg et al. | 123/478 |

*Primary Examiner*—Raymond A. Nelli
*Attorney, Agent, or Firm*—Schwartz, Jeffery, Schwaab, Mack, Blumenthal & Koch

[57] ABSTRACT

Normally, an air-fuel ratio is controlled in accordance with the engine speed and the intake air quantity of an internal combustion engine with a turbocharger. When the output pressure of the turbocharger increases excessively, an intake relief valve opens to decrease the intake air quantity. In this case, the fuel injection quantity is controlled solely in accordance with the engine speed.

3 Claims, 3 Drawing Figures

AIR-FUEL RATIO CONTROL APPARATUS AND METHOD FOR AN INTERNAL COMBUSTION ENGINE WITH A TURBOCHARGER

BACKGROUND OF THE INVENTION

The present invention relates to an internal combustion engine with a turbocharger which supplies supercharged intake air to the engine, thereby improving the engine output power, and more particularly to an air-fuel ratio control apparatus and method for use in such an engine.

With a conventional air-fuel ratio control apparatus for an internal combustion engine with a turbocharger, fuel injection quantity is controlled in accordance with engine speed and the rate of flow of intake air through an air flowmeter to the turbocharger. When the output pressure of the suppercharger increases excessively, an intake relief valve opens so that the actual air quantity flowing to the engine decreases, but the fuel quantity remains constant. This causes an air-fuel mixture to be enriched, thereby rendering the operating state of the engine unstable and increasing the amount of harmful exhaust emissions.

SUMMARY OF THE INVENTION

According to the present invention, when an intake relief valve, provided in the air intake passageway to an internal combustion engine from the compressor of a turbocharger, is opened due to excessive supercharged output pressure from the turbocharger, the fuel injection quantity is controlled in accordance with engine speed only. Thus, the air-fuel ratio is controlled to an optimal value, thereby improving the stability of the engine operation and decreasing harmful exhaust emissions greatly.

BRIEF DESCRIPTION OF THE DRAWINGS

Objects, features, and advantages of the present invention will be apparent from the following description of a preferred embodiment thereof, taken in conjunction with the accompanying drawings in which.

DETAILED DESCRIPTION OF A PREFERRED EMBODIMENT

Figure 1:
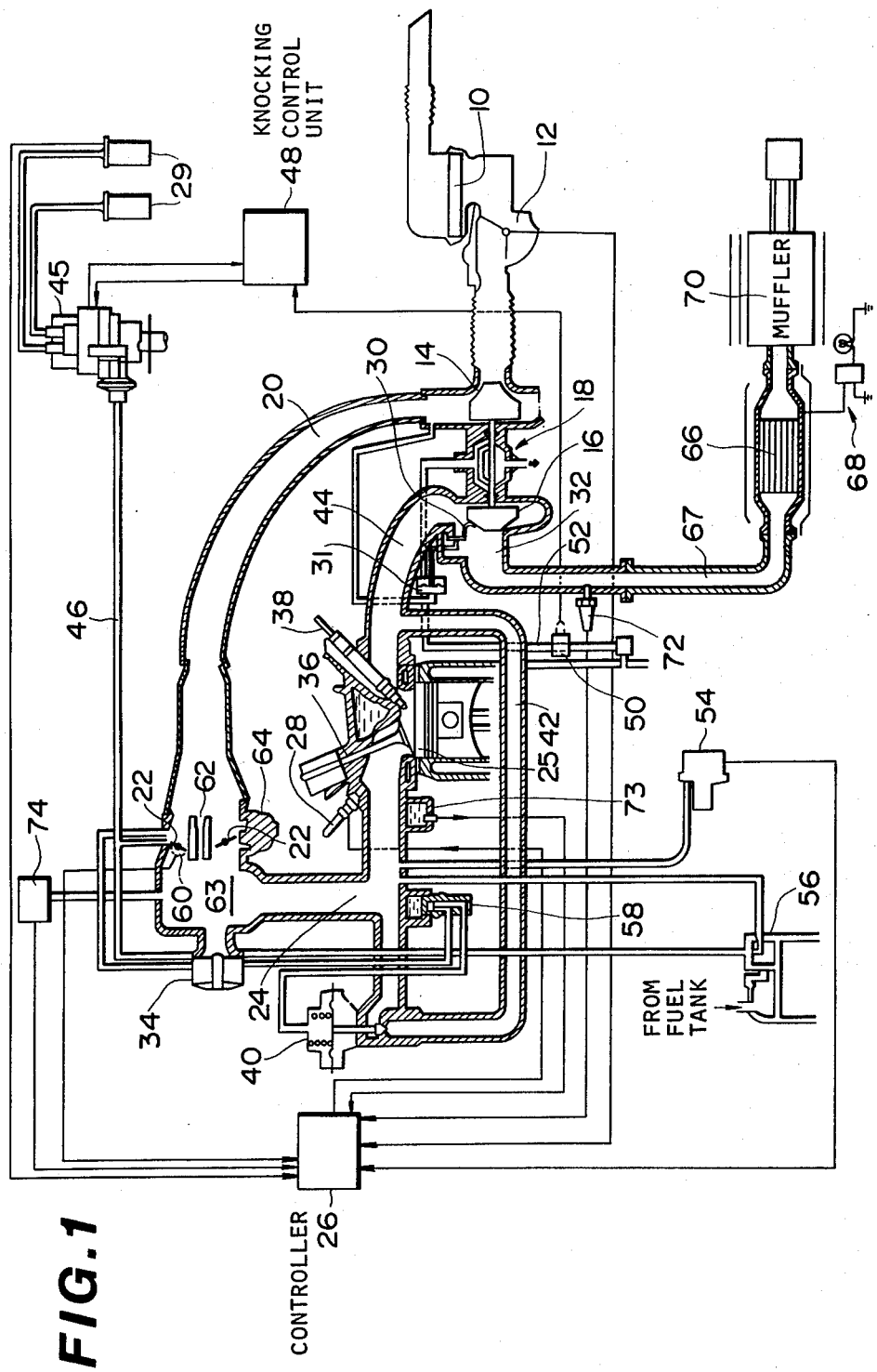
FIG. 1 is a diagrammatic view of an internal combustion engine with a turbocharger in which the present invention is incorporated.

In FIG. 1, there is shown an internal combustion engine in which the present invention is incorporated. Air drawn in through an air cleaner 10 passes through an air flowmeter 12 and then is compressed by an intake compressor 14 secured coaxially to an exhaust gas turbine 16 of a turbocharger 18 so as to rotate therewith. The air then passes through an intake passage 20, throttle valves 22 and an intake manifold 24 to the engine cylinder 25.

Fuel is injected, from an injector 28 provided, for example, in the manifold 24, toward supercharged air flowing into the cylinder 25. The amount of fuel injected is controlled by a controller 26 in accordance with the intake air quantity sensed by the air flow meter 12 and the engine speed sensed by ignition coils 29 so as to maintain an optimal air-fuel ratio during normal driving or acceleration. To prevent the turbocharger 18 from attaining an excessive speed which would create excessive supercharged pressure and knocking, a switching valve 30 is provided in the turbocharger 18 to open a passageway 32 bypassing the exhaust gas turbine 16 by an actuator 31 operated when the pressure of air discharged from the air intake compressor 14 exceeds a threshold value. This decreases the amount of exhaust gas conducted from the engine to the exhaust gas turbine 16. However, when the switching valve 30 malfunctions or when the supercharger pressure can not appropriately be controlled so that the turbocharger output pressure further increases, an intake relief valve 34, provided downstrean of the throttle valve 22 in the intake passage 20, opens to vent pressurized air from the intake passageway 20 to the atmosphere to prevent the turbocharger output pressure from exceeding an upper limit, thereby preventing damage to the engine. Reference numeral 36 denotes an air intake valve provided at the top of the cylinder 25, and reference numeral 38 denotes a spark plug provided at the top of the cylinder 25. An EGR (exhaust gas recirculation) control valve 40 is provided in an exhaust gas recirculation passageway 42 through which part of the exhaust gas from an exhaust gas passageway 44 is conducted to the air intake passageway 20. Reference numeral 45 denotes a distributor which is responsive to the pressure of supercharged air from a passageway 46 for vacuum spark advance angle control. A knocking control unit 48 receives a knocking signal from a knocking sensor 50 mounted on the engine when knocking occurs and an engine speed signal from the distributor 45, and outputs a spark timing retard signal through the distributor 45 to the ingition coils 29. A passageway 52 conducts lubricant from the engine cylinder to the bearings of the turbocharger 18 and hence drains into an oil pan, not shown. A boost switch 54 senses the intake vacuum pressure to sent a fuel-boost signal to the control unit 26 when the intake vacuum pressure is higher than a threshold value in order to feed an appropriately rich mixture fuel when engine load is high. A vapor-purge cannister 56 serves to absorb evaporated gas accumulating in the fuel tank while the engine is off in activated carbon so as to prevent discharge of the gas vapor to the atmosphere. A valve 58 closes when the temperature of the cooling water is below a threshold value, thereby preventing application of vacuum pressure to the EGR control valve 40 and stopping EGR operation when the engine is cold. A throttle valve switch 60 is turned on to send a signal to the controller 26 to cut off a fuel injection quantity to the engine when the throttle valves 22 are closed. A pressure-relief valve 62 prevents excessive increase in the intake vacuum pressure at a point 63 downstream of the valve 62. An air regulator 64 permits a small amount of compressed air to bypass the closed throttle valves 22 during idling as the engine warms up. A catalytic converter 66, disposed in an exhaust gas duct 67, reduces CO, HC and $NO_x$ emissions and an alarm device 68 produces an alarm when the temperature of exhaust gas is higher than a threshold value. A muffler 70 is disposed downstream of the catalytic converter 66. An oxygen sensor 72 senses the content of oxygen in exhaust gas and sends a signal indicative thereof to the controller 26 for use in maintenance of a stoichiometric air/fuel ratio. A coolant sensor 73 senses the temperature of engine coolant and sends a signal indicative of engine temperature to the controller 26 for use in calculation of fuel injection quantity, this signal being especially important when the engine is relatively cold. The structure described above is well known in the automotive art.

According to the invention, a pressure sensor 74 is provided downstream of throttle valves 22 in the air intake passageway 20 or in the intake manifold 24 to sense the intake pressure in the intake passageway 20. The pressure sensor 74 outputs an electrical signal proportional to the intake pressure or the turbocharger output pressure to the controller 26. Controller 26 calculates the fuel injection quantity solely on the basis of the engine speed sensed by the ignition coils 28 when the turbocharger output pressure reaches the value at which the intake relief valve 34 operates.

The actual intake air quantity flowing into the engine cylinder is normally a function of the turbocharger output pressure and the engine speed. However, in this case, the turbocharger output pressure in the intake manifold 24 is maintained substantially constant by the intake relief valve 34 so that the intake air quantity is a function of the engine speed alone. Thus, while the intake relief valve 34 is open, and thus fuel quantity is determined solely in accordance with the engine speed, the air-fuel ratio is maintained at an appropriate value, that is, the air-fuel mixture will not be excessively enriched.

Figure 2:
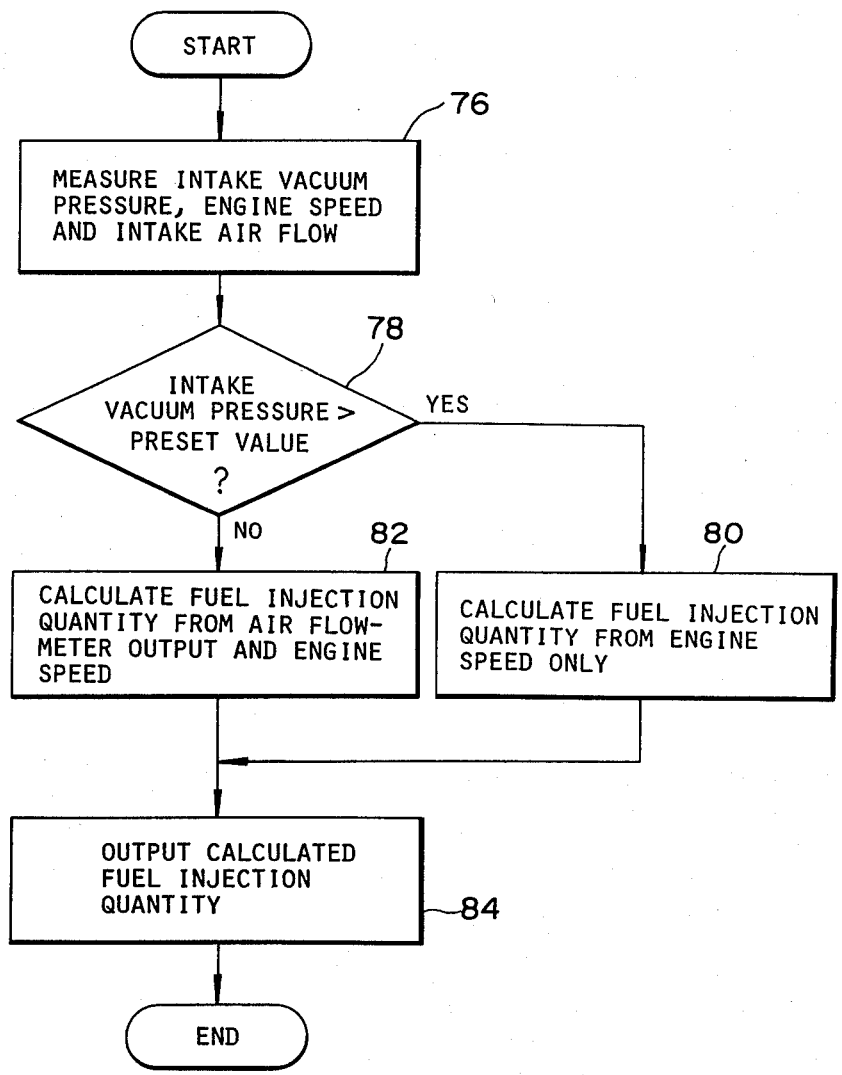
FIG. 2 is a flowchart for execution of the present invention.

The operation of the air-fuel controller 26 is shown in the flowchart of FIG. 2. At step 76, the pressure sensor 48 output, the engine speed signal, and the air flowmeter 22 output are inputted to the controller 26. At step 78, the intake pressure is compared with a threshold value. If the intake pressure is larger than the threshold value, that is, if the result is YES, the fuel injection quantity, in the form of duration of fuel injection valve 28 opening, is calculated solely on the basis of engine speed at step 80, whereas if the result is NO, the fuel injection quantity is calculated on the basis of the air flowmeter 12 output and the engine speed at step 82. At step 84, fuel is injected in accordance with the calculated duration.

Figure 3:
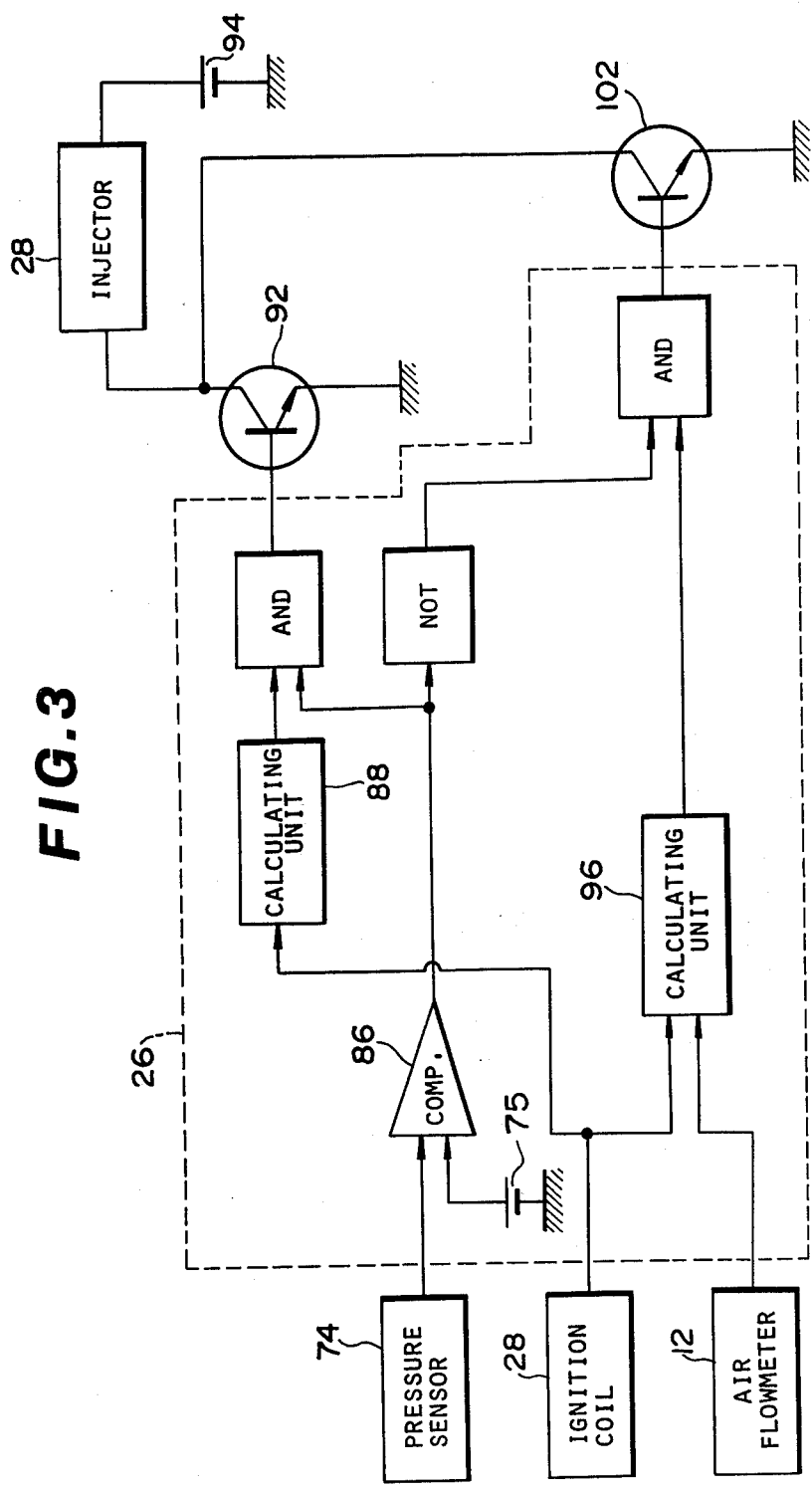
FIG. 3 is a block diagram of an air-fuel ratio control apparatus according to the present invention.

FIG. 3 is a block diagram of the controller 26, shown delimited by a broken line, in conjunction with the pressure sensor 74, the ignition coil 29, the air flowmeter 12 and the injector 28. A comparator 86 compares the output of the pressure sensor 74 to a reference voltage value 75 representing the pressure maintained during operation of the intake relief valve 34. When the pressure sensor 74 output is higher than the reference, the comparator 86 outputs a high output.

In a calculating unit 88, a fuel injection quantity is calculated in accordance with the engine speed signal from the ignition coil 29. The output of the calculating unit 88 and the output of the comparator 86 are inputted to an AND gate 90. When the output of the comparator 55 is high, a power transistor 92 is operated in accordance with the output of the calculating unit 88 and, as a result, the injector 28 is supplied with current from a battery 94, thereby opening the fuel injector 28 to inject fuel into the engine for the calculated time duration. Thus, during the operation of the intake relief valve 34, fuel is injected solely in accordance with the engine speed.

When the output of the pressure sensor 74 is lower than the reference value, and the intake relief valve 34 is inoperative, the output of the comparator 86 is low. A calculating unit 96 calculates the fuel injection quantity on the basis of the output of the air flowmeter 12 and the engine speed signal from the ignition coil 29. The output of the calculating unit 96 and the output of an invertor 98, which inverts the output of the comparator 86, are inputted to an AND gate 100. Thus, when the output of the comparator 86 is low, a power transistor 102 is operated in accordance with the output of the calculating unit 96. In this case, the injector 28 is controlled by the operation of the transistor 102 to inject fuel for the calculated time duration.

In FIG. 3, the functions of the calculating units 88, 96, the logical gates 90, 98, 100, and the comparator 86 may all be performed by a single microcomputer unit, for example.

Thus, an optimal air-fuel ratio is maintained, stability of the engine operation is improved, and harmful exhaust emissions are reduced even if the swing valve 30 disposed in the turbocharge 18 malfunctions, or the turbocharger output pressure increases uncontrollably for some reason, and part of the intake air measured by the air flowmeter 12 is vented out of the intake passageway 20 so that the measured air flow is different from the air flow admitted to the engine.

While the present invention has been described in terms of a preferred embodiment thereof, the present invention is not limited to the embodiment. Many modifications and variations could be made by those skilled in the art without departing from the spirit and scope of the present invention as set forth in the appended claims.

What is claimed is:

1. An air-fuel ratio control apparatus for an internal combustion engine having a turbocharger disposed in an air intake passageway to the engine for urging compressed air to an intake passageway to said engine, an intake relief valve for venting part of the compressed air to the atmosphere in response to the compressed air pressure exceeding a predetermined value, and a fuel injector for injecting fuel into said engine, said air-fuel ratio control apparatus comprising:
   (a) an air flowmeter for sensing the intake air flow to said engine and outputting a signal indicative thereof;
   (b) means for sensing engine speed and outputting a signal indicative thereof;
   (c) means for detecting whether said intake relief valve is open; and
   (d) means for controlling the duration for which said fuel injector is opened to cause fuel to be injected therethrough into said engine in accordance with both the outputs of said air flowmeter and said engine speed sensing means when said detecting means does not detect that said intake relief valve is open, and solely in accordance with the output of said sensing means when said detecting means detects that said intake relief valve is open.

2. An air-fuel ratio control apparatus as set forth in claim 1, wherein said controlling means comprises:
   (a) a comparator for comparing the output of said detecting means to a reference value representative of the state in which said intake relief valve is open to produce a high output when the output of said detecting means is higher than said reference value;
   (b) means for calculating the fuel injection duration for said fuel injector in accordance with the output of said sensing means;
   (c) means responsive to the high output from said comparator for supplying a first signal indicative of the calculated fuel injection duration to said fuel injector;

(d) means for calculating the fuel injection duration on the basis of the outputs of said air flowmeter and said engine speed sensing means; and (e) means responsive to the absence of said high output from said comparator for supplying a second signal indicative of the calculated fuel injection duration to said fuel injector.

3. An air-fuel ratio control method for an internal combustion engine having a turbocharger disposed in an air intake passageway to the engine for urging compressed air to an intake passageway to said engine, an intake relief valve for venting part of the compressed air to the atmosphere in response to the compressed air pressure exceeding a predetermined value, and a fuel injector for injecting fuel into said engine, said air-fuel ratio control method comprising the steps of:

(a) sensing the intake air flow to said engine and outputting a signal indicative thereof;

(b) sensing engine speed and outputting a signal indicative thereof;

(c) detecting whether said intake relief valve is open; and (d) controlling he duration for which said fuel injector is opened to cause fuel to be injected therethrough into said engine in accordance with both the outputs of said air flowmeter and said engine speed sensing means, when said detecting means does not detect that said intake relief valve is open, and solely in accordance with the output of said sensing means when said detecting means detects that said intake relief valve is open.

* * * * *